Feb. 4, 1930. W. FERGUSON 1,746,077
DOLLY
Filed May 4, 1928
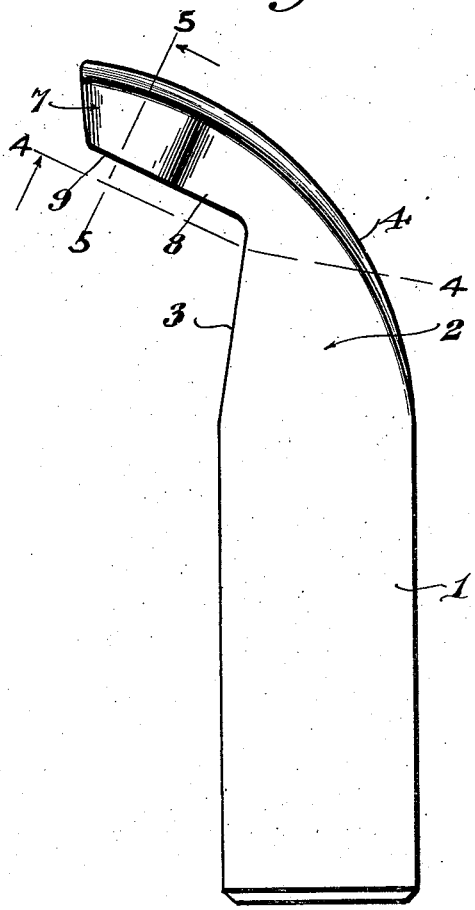
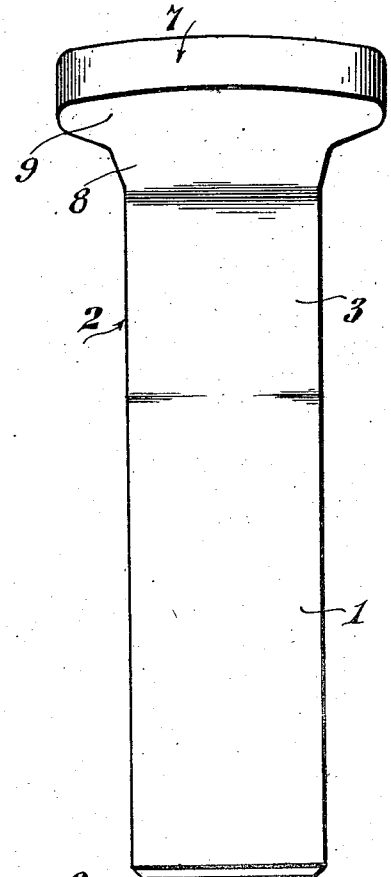
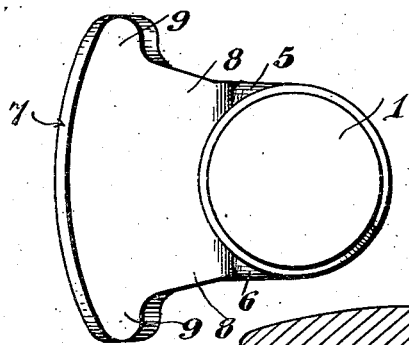
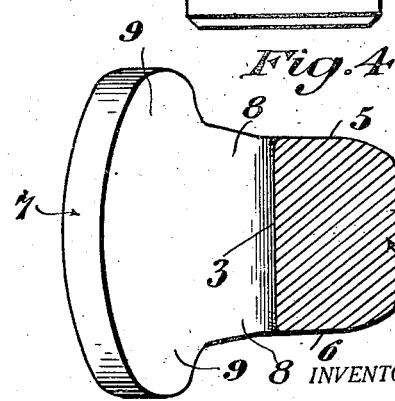
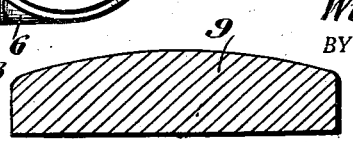
INVENTOR.
William Ferguson,
BY Geo. P. Kimmel
ATTORNEY.

Patented Feb. 4, 1930

1,746,077

UNITED STATES PATENT OFFICE

WILLIAM FERGUSON, OF FLINT, MICHIGAN

DOLLY

Application filed May 4, 1928. Serial No. 275,220.

This invention relates to tools to be used for metal bumping work, and more particularly to a dolly for use in bumping out indentations in cowls and other portions of an automobile due to collisions and accidents, and the invention has for its object to provide a bumping-out tool or dolly adapted for use in reaching various more or less inaccessible portions of an automobile, such for example as the indentation of the cowl without the necessity of tearing down the instrument panel to get to the indentation for the purpose of bumping it out.

A further object of the invention is to provide a bumping-out tool consisting of a shank portion adapted to be held in the hand during the bumping out operation and an arm portion provided with a bumping surface having approximately the same curvature as the work to be bumped out, the arrangement being such that the tool can be conveniently held in the hand to support the curved bumping out surface against the cowl or other curved surface of an automobile during the bumping out operation.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a cowl dolly in accordance with this invention.

Figure 2 is a front elevation thereof.

Figure 3 is a rear end view.

Figure 4 is a section on line 4—4 of Figure 1.

Figure 5 is a section on line 5—5 of Figure 1.

The dolly comprises a shank 1 of a size and shape to form a handle that can be conveniently held in the hand and which in the construction shown is cylindrical in cross section and the shank is formed at one end with a tapered extension 2 disposed in the same plane as that of the handle.

The extension 2 is formed with four side faces 3, 4, 5 and 6. The faces 3, 4 are opposite each other. The faces 5, 6 are opposite each other. Each of the faces 5, 6 gradually decreases in width from the inner to the outer end thereof. The face 3 extends at an inward inclination throughout from its inner to its outer end. The face 4 extends at an inward inclination throughout from its inner to its outer end and at an opposite inclination with respect to face 3 whereby said faces 3, 4 project from their inner ends towards the longitudinal axis of the shank. The face 4 is of greater length than face 3 and is upon a convex curve lengthwise from its inner a towards its outer end. In transverse section, at any point throughout the face 4 is of arcuate contour, and with such curvature being convex. The faces 5, 6 are rounded.

Formed integral with the outer end of the extension 2 is an outwardly inclined, laterally extending anvil or arm 7 consisting of an inner flared portion 8 and an outer, substantially oval-shaped portion 9. The outer face of the arm 7 transversely thereof is of arcuate form providing a continuation of the arcuate face 4 of the extension 2. With respect to the face 4 of the extension 2 and outer face of the arm 7, both being of arcuate contour transversely, the arc from the inner end of the said face 4 to the outer end of the arm 7 gradually decreases. The portion 9 of the arm 7 is of greater width than portion 8. The arm 7 is of less thickness than the shank and extension.

The shank 1 is of suitable length to facilitate holding the dolly in engagement with the work, the construction being such that the shank 1 is held firmly in the hand with the curved outer surface 4 of the laterally extending arm in engagement with the inner curved surface of the cowl or other sheet metal structure to be bumped out. The construction of the outer end portion of the arm 7 whereby its curved surface is disposed at an acute angle to the shank 1 and has its width increased as at 9 facilitates the insertion of this portion of the tool into corners and other restricted places in engagement with the surface to be bumped out. Furthermore the shank 1 is made relatively heavy to cause its weight or inertia of rest to resist the bumping out blows delivered to the curved bumping surface of the tool.

The face 3 on the extension 2 provides a reentrant angle to enable close fitting in a narrow space and for the thrust to come substantially on the anvil surface. The angle extends towards the horizontal axis of the shank.

What I claim is:

1. A dolly comprising a shank, an extension at one end thereof having opposed faces, one of said faces inclining towards the other and of arcuate contour transversely, and a laterally projecting, outwardly inclined arm integral with the outer end of the extension and having its outer face of arcuate contour transversely and forming a continuation of the arcuate face of the extension.

2. A dolly comprising a shank, an extension at one end thereof having opposed faces, one of said faces curved lengthwise throughout said curved face inclining towards the axis of the shank and being also of arcuate contour transversely, and a laterally projecting and outwardly inclined arm integral with the outer end of the extension and having its outer face of arcuate contour transversely and forming a continuation of the arcuate face of the extension.

3. A dolly comprising a shank, an extension at one end thereof having opposed faces, one of said faces being of arcuate contour transversely, a laterally projecting, outwardly inclined arm integral with the outer end of the extension and having its outer face of arcuate contour transversely and forming a continuation of the arcuate face of the extension, and said arm having a flaring inner portion and a substantially oval-shaped outer portion.

4. A dolly comprising a shank, an extension at one end thereof having opposed faces, one of said faces inclining towards the other and swerves lengthwise throughout, said face being of arcuate contour transversely, a laterally projecting and laterally inclined arm integral with the outer end of the extension and having its outer face of arcuate contour transversely and forming a continuation of the said face of the extension, and said arm having a flaring inner portion and a substantially oval-shaped outer portion.

5. A dolly comprising a shank, an extension at one end thereof and having a pair of opposed faces, one of said faces being plane and inclining towards the other, said other face being curved lengthwise and inclining towards the plane face, said curved face further being of arcuate contour transversely, and a forwardly projecting arm integral with the outer end of the extension and having its outer face of arcuate curvature transversely and forming a continuation of the arcuate curved face of the extension.

6. A dolly comprising a shank, an extension at one end thereof and having a pair of opposed faces, one of said faces being plane and inclining towards the other, said other face being curved lengthwise and inclining towards the plane face, said curved face further being of arcuate contour transversely, and a forwardly projecting arm integral with the outer end of the extension and having its outer face of arcuate curvature transversely and forming a continuation of the arcuate curved face of the extension, said arm being outwardly inclined and having an inner flaring portion and an outer semi-oval-shaped portion.

7. A dolly comprising a shank, a tapered extension at one end thereof and disposed in the direction of the length of the shank, a forwardly directed arm integral with the outer end of the extension and formed of a flaring inner portion and an oval-shaped outer portion, said extension having one of its faces of arcuate contour transversely and said arm having its outer face of arcuate contour transversely and forming a continuation of the arcuate face of the extension.

8. A dolly comprising a shank, a tapered extension integral with one end thereof and extending lengthwise with respect thereto, an upwardly inclined arm integral with the outer end of said extension and provided with a substantially oval-shaped outer portion, said extension having one of its faces of arcuate curvature transversely and said arm having its outer face of arcuate curvature transversely and forming a continuation of the arcuate face of the extension.

9. A dolly comprising a unit form of a shank, an extension and an inclined arm, said arm projecting laterally from and at an outward inclination with respect to the extension, said unit further having a curved face extending from the inner end of the extension to the outer end of the arm, said face being of convex curvature in longitudinal and transverse section, and said arm having its inner face plane.

10. A dolly comprising a unit formed of a shank, an extension and an inclined arm, said arm projecting laterally from the extension, said unit further having a curved face extending from the inner end of the extension to the outer end of the arm, said face being of convex curvature in longitudinal and transverse section, and the outer portion of said arm being of greater width than the inner portion thereof.

11. A dolly comprising a unit including a shank, a tapered extension at one end of the shank and a laterally disposed, outwardly inclined arm projecting from the outer end of the extension, said unit further including a curved face extending from the inner end of the extension to the outer end of said arm, the curvature of said face being convex in transverse and longitudinal section, and said extension extending in the plane of the shank.

12. A dolly comprising a shank, a tapered extension integral with one end thereof and extending lengthwise with respect thereto, a laterally inclined arm integral with the outer end of said extension and provided with a substantially oval-shaped outer portion, said extension having one of its faces of arcuate curvature transversely and said arm having its outer face of arcuate curvature transversely and forming a continuation of the arcuate face of the extension, said arm being of less thickness and of greater width than said extension and shank.

13. A dolly comprising a unit formed of a shank, an extension and an inclined arm, said arm projecting laterally from the extension, said unit further having a curved face extending from the inner end of the extension to the outer end of the arm, said face being of convex curvature in longitudinal and transverse section, and the outer portion of said arm being of greater width than the inner portion thereof, said arm being of less thickness and of greater width than said extension and shank.

14. A dolly comprising a relatively heavy shank adapted to be held in the hand in bumping out work, a tapered extension at one end of the shank, and a curved laterally extending anvil or arm connected to the extension by a narrow portion, the anvil part then widening into a distinct transverse oval part, and having an arcuate bumping surface extending longitudinally of the arm and extension.

15. A dolly comprising a relatively heavy shank adapted to be held in the hand in bumping out work, an extension at one end of the shank, and a curved laterally extending anvil or arm connected to the shank by the extension and having an arcuate bumping surface extending longitudinally of the anvil or arm, the extension on the anvil side having a re-entrant angle towards the horizontal axis of the shank.

16. A dolly comprising a relatively heavy shank adapted to be held in the hand in bumping out work, an extension at one end of the shank, a curved laterally extending anvil or arm connected to the shank by the extension and having side projections near its end to increase its width and an arcuate bumping surface extending longitudinally of the anvil or arm, the extension on the anvil side having a re-entrant angle towards the horizontal axis of the shank.

In testimony whereof, I affix my signature hereto.

WILLIAM FERGUSON.